United States Patent [19]
Merz

[11] 3,929,508
[45] Dec. 30, 1975

[54] RESERVE BATTERY
[75] Inventor: William Carl Merz, Delaware, Pa.
[73] Assignee: The United States of America as represented by the Secretary of the Navy, Washington, D.C.
[22] Filed: Mar. 15, 1974
[21] Appl. No.: 451,621

[52] U.S. Cl. ............................................. 136/114
[51] Int. Cl.² ...................................... H01M 21/10
[58] Field of Search ...................... 136/112–114, 136/90, 162

[56] References Cited
UNITED STATES PATENTS

| | | | |
|---|---|---|---|
| 3,294,589 | 12/1966 | Barrett | 136/114 X |
| 3,536,536 | 10/1970 | Lucas | 136/114 |
| 3,674,566 | 7/1972 | Powers | 136/114 |
| 3,743,545 | 7/1973 | Merz et al | 136/114 |
| 3,748,183 | 7/1973 | Zaleski | 136/114 |

Primary Examiner—Anthony Skapars
Attorney, Agent, or Firm—R. S. Sciascia; R. E. O'Neill

[57] ABSTRACT

An improved reserve battery for providing electrical current when an unexpected need arises and in particular the invention involves a battery container including four dry porous cells, a bellow including a solvent to energize the cells, means for separating the solvent and the cells until electricity is needed and a means for puncturing the separating means and mixing the solvent with the dry porous portion.

7 Claims, 2 Drawing Figures

RESERVE BATTERY

The invention described herein may be manufactured and used by or for the Government of the United States of America for governmental purposes without the payment of any royalties thereon or therefor.

Over the years, it has been desirable to have electrical systems which will produce energy at some future time upon demand. Such a system is uniquely adaptable to safety equipment such as radio transmitters used in survival equipment at sea. The general demand for such a system includes having minimum current and voltage available for a given length of time and such a system is to be storable over the use of the life of the battery which may be of from 3 to 5 years.

In the past, many such battery systems have been designed and have evolved. Theoretical treatment of the overall battery design showed the most volumetrically efficient cell stack to be four-quarter round bobbin cells with interior cathodes and exterior anodes arranged with axes parallel to the axis of the battery case.

First "dry" $CuF_2$ bobbin cells were tested. Fabrication of "dry" $CuF_2$ cathodes necessitated the establishment of a new molding technique. This technique involves the simultaneous application of pressure and electrical current to the cathode mix, resulting in a mechanically stable, easy to handle, highly conductive bobbin, despite the irregular shape.

The invention described and disclosed in the application resulted from a continuing demand for survival equipment energy sources. The special requirement was to develop experimental batteries for a survival radio. The required construction required that the battery be hermetically sealed, be capable of five year storage and provide a wet life in excess of 72 hours. The voltage output was 12 volt nominal, and 9.5 volt minimum. The current demand was 70 ma constant plus 300 ma/300 plus every half hour. The life of the battery was designated to be 24 hours at plus 75°F, 15 hours at +122°F and 6 hours at −22°F.

It is therefore an object of this invention to provide an improved reserve battery.

It is yet a further object of this invention to provide an improved reserve battery for providing electrical energy including a dry portion and a wet portion hermetically sealed from each other and means for actuating a mechanism to allow the liquid activator to be dispersed within the dry portion.

It is still a further object of this invention to provide an improved reserve cathode structure for reserve batteries comprising; a new method of construction which imparts unique chemical and mechanical properties for a cathode of such a battery.

And still a further object of this invention is to provide an improved reserve battery comprising; a battery housing, an anode structure within the housing, a cathode structure within the housing, a dry material cell within the housing between the anode and the cathode, a collapsable solvent container attached to the housing, the solvent container sealed from the housing by a diaphragm, means to collapse the solvent container, and a solvent in the solvent container and means within the solvent container for providing access to the housing so that upon demand the liquid in the solvent container can be dispersed within the dry material cell between the anode structure and the cathode structure so that the liquid and the dry material react chemically to provide electrical current from the anode and the cathode structures.

Other objects, advantages and novel features of the invention will become apparent from the following detailed description of the invention when considered in conjunction with the accompanying drawings wherein.

Figure 1:
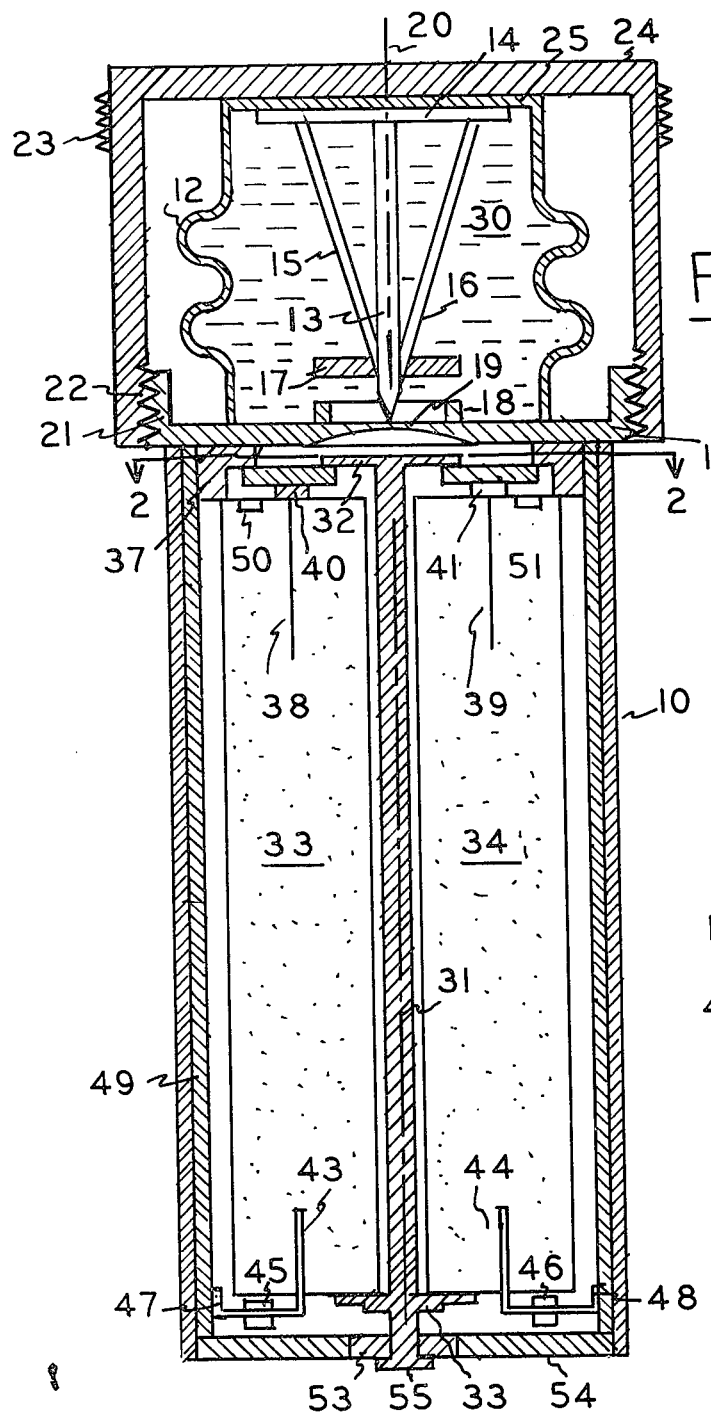
FIG. 1, is a sectional view of one embodiment of the invention.
Figure 2:
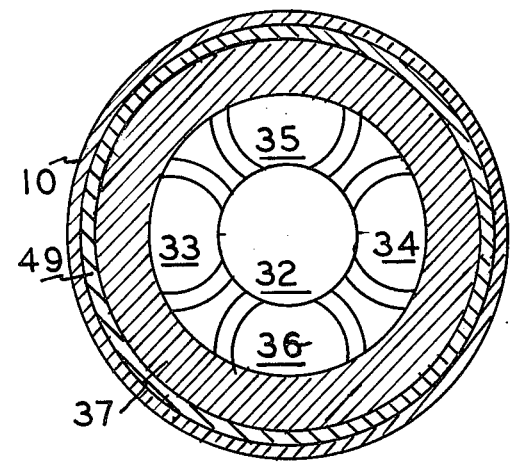
FIG. 2, is a sectional view along lines 2—2 of FIG. 1.

The basic structure of the reserve battery consists of a housing or battery case 10, a diaphragm plate 11, and a collapsable bellows 12. Within the bellows structure there is positioned a lance 13 mounted on a base 14 and supported by struts 15 and 16. About the lance and strut structure at the lower end is a collar 17 whose function will be described later.

There is mounted on the diaphragm a guide ring 18 centered about a reduced cross section or thinner portion of the diaphragm plate 11. The lance 16, collar 17, guide ring 18 and reduced portion of the diaphragm 19 are all co-aligned along a major axis 20.

In the embodiment shown the outer portion of the diaphragm ring 21 is threaded and is designed to accept the threaded portion 22 of a screw cap 23. The upper portion 24 of the screw cap 23 engages the upper portion 25 of bellows 12. Bellows 12 is welded to the upper surface of diaphragm 11 and defines therewith a space within which a solvent generally designated as 30 is confined.

Inside battery case 10 along the major axis is a support structure or spindle 13 whose upper portion 32 has an enlarged cap or portion. A base support plate 33 is affixed to spindle 31 and is designed to support four cells 33, 34, 35, and 36. An insulated support ring 37 is designed to position the four cells 33, 34, 35 and 36 within the battery case and to retain them in fixed relationship. Wires 38, 39 are connected to electrical caps 40, 41. Wires 43, 44 in the lower end of cells 33, 34 connect to diodes 45 and 46 respectively. Electrical connection is made thru wires 43, 44 to diodes 47, 48 and to an anode structure 49, a cylindrical shaped member within battery case 10.

Additionally, valves 50, 51 are provided in the cells 33, 34.

Base plate 33 is connected thru an insulated portion 53 of terminal plate 54 to an external cathode plate terminal 55. In operation these reserve batteries are provided in a survivor kit for energizing a radio transmitter when needed. Should electrical energy be necessary, a person would take the battery and screw the cap 23 in a downward direction along axis 20. Lance 19 advances encountering the thin portion of the diaphragm plate and puncturing it. As the cap continues in its downward direction under the pressure of cap 23 the lance penetrates until collar 17 encounters the guide line 18 at which time the lance and structure begin to collapse.

In one successful embodiment, the pressure to penetrate the diaphragm was 2 to 3 pounds per square inch. Continued advancement of the cap drives the electrolyte solvent 30 into the space within the upper portion of the battery housing. The valves 50, 51 open and the solvent electrolyte penetrates into the dry porous cell structure 33, 34 at which time the chemical reaction starts which produces electrical current upon demand. The diode structure 45, 46 is provided to prevent current reversal.

Obviously many modifications and variations of the present invention are possible in the light of the above teachings. It is therefore to be understood that within the scope of the appended claims the invention may be practiced otherwise than as specifically described.

I claim:
1. An improved reserve battery comprising;
   a. a battery housing;
   b. an anode structure within said housing;
   c. a cathode structure within said housing;
   d. a dry material cell within said housing between said anode and said cathode and filled with a dry material;
   e. a diaphragm permanently attached to said battery housing;
   f. a collapsable solvent container structure mountably attached to said diaphragm, said solvent container structure being sealed from said housing by said diaphragm when said solvent container structure is mountably attached to said diaphragm;
   g. means to collapse said solvent container; and
   h. a solvent in said solvent container structure and means within said solvent container structure for providing access to said housing so that upon demand said liquid in said solvent container structure can be dispersed within the dry material cell between said anode structure and said cathode structure so that said liquid and said dry material react chemically to provide electrical current from said anode and said cathode structures.

2. The improved reserve battery of claim 1 wherein said mountably attached solvent container structure includes a collapsable bellows member and contained within it a lance to pierce a hole in said diaphragm in said battery housing.

3. The improved reserve battery of claim 2 wherein a collar is provided on said lance to prevent said lance from penetrating beyond a certain point in said diaphragm and said battery housing thereby preventing damage to said battery housing.

4. The improved reserve battery of claim 3 wherein end plates are provided within said battery housing to confine said solvent material therein and provide improved mixing of said liquid within said dry material; valves provided in said end plates to allow the inflow of said solvent into said battery housing, and to prevent intercell electrical leakage via common electrolyte path.

5. The improved reserve battery of claim 4 wherein electrical connections are provided to allow electrical current to flow in external circuits.

6. The improved reserve battery of claim 5 wherein diodes are provided internally in said battery wiring to prevent current reversals.

7. The improved reserve battery of claim 6 wherein a plurality of dry material cells are positioned to be energized by the solvent in said bellows.

* * * * *